May 26, 1931.     H. H. IDE     1,806,903
TRANSMITTER SUSPENSION ARM
Filed March 17, 1930
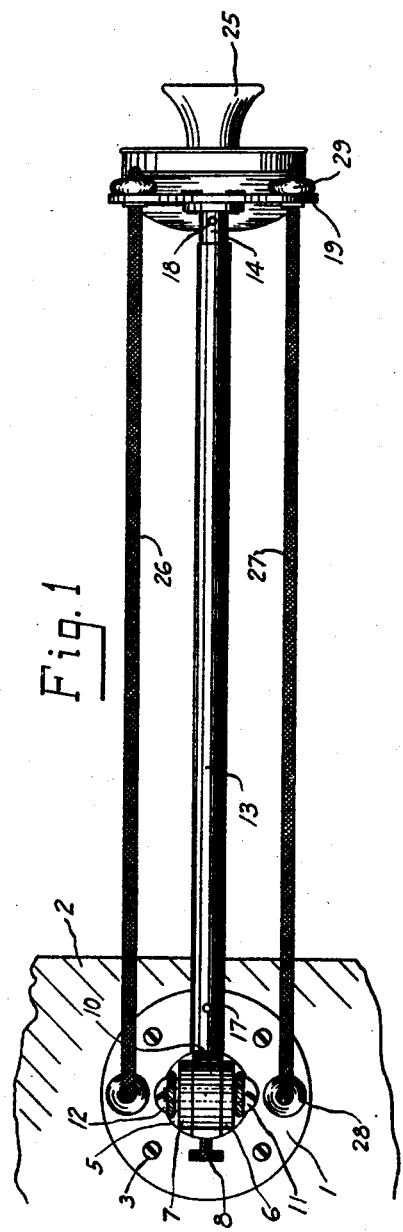
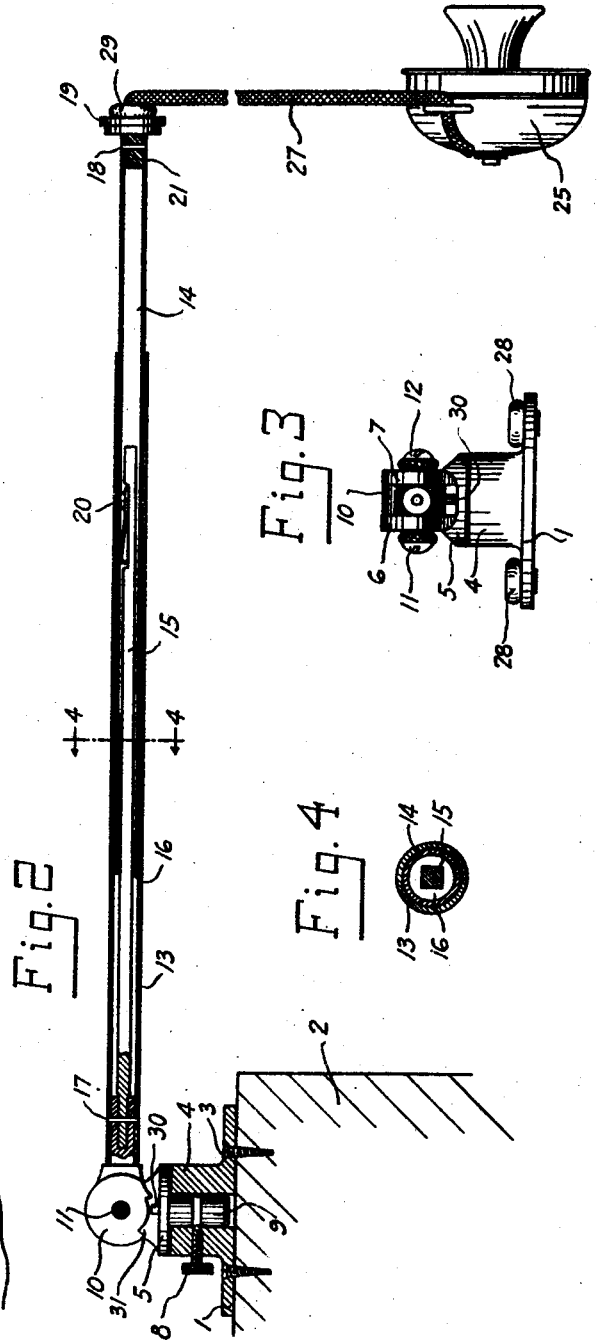
Inventor
Harry H. Ide Patented May 26, 1931

1,806,903

UNITED STATES PATENT OFFICE

HARRY H. IDE, OF CHICAGO, ILLINOIS ASSIGNOR TO AMERICAN ELECTRIC COMPANY, INC., OF CHICAGO, ILLINOIS, A CORPORATION OF DELAWARE

TRANSMITTER SUSPENSION ARM

Application filed March 17, 1930. Serial No. 436,432.

This invention relates in general to transmitter supports, but more particularly to a transmitter suspension arm or bracket for supporting an operator's transmitter on a switchboard, and the principal object of the invention resides in the design of an operator's transmitter suspension arm that may be rotated horizontally, pushed in or out, or moved vertically in order to assume any desired position before the operator.

A further object of the invention resides in the provision of a universal-positioned transmitter suspension arm which may be cheaply constructed of a small number of standard parts.

A further object of the invention resides in the provision of means whereby the end of the transmitter arm supporting the transmitter cord, is prevented from rotating so that the transmitter will be always maintained in the same position before the operator.

A further feature of the invention resides in the provision of a plurality of telescoping tubular members and means for preventing the turning of them relative to one another.

The invention is illustrated in accordance with the accompanying sheet of drawings in which Fig. 1 shows a top or plan view of the transmitter suspension arm in its retracted position.

Fig. 2 is a cross-sectional side view showing the details of construction, and with the transmitter support partly extended.

Fig. 3 is a front view of the transmitter arm supporting base, while Fig. 4 is a cross-sectional view along the line 4—4 of Fig. 2 in order to show the relationship between the different tube members.

The suspension arm support is fastened above the usual type of operator's switchboard 2 by means of screws 3 in the base plate 1. The rotatable member 5 has a round extension 9 protruding into the center of the round extended part 4 of the base 1. A groove extends around the circumference of the extension 9 so that the thumb screw 8, threaded into the part 4 of the base 1, can securely hold extension 9 in the base, while at the same time permit rotation of the member 5. A pair of ears 6 and 7 on the member 5 extend upwardly and each has a hole through which the bolt 11 extends on one side, and a nut 12 threads onto the bolt on the other side. The vertically-movable member 10 is placed between the ears 7 and 8 and is clamped in place by the bolt 11 and nut 12. The arm 10 has an up-and-down movement, and the bolt 11 may be tightened up to hold it firmly in any position. Its vertical up-and-down movement is limited by the pin 30 in the member 5, which strikes the abutments 31 cut into member 10.

The suspension arm comprises a hollow tube 13, one end of which engages the protruding end of the member 10, while the other end is free. A solid square bar 15 has a round projecting end engaging an opening in the center of the member 10. The pin or rivet 17 securely holds the tube 13 and the bar 15 onto the member 10 in fixed relationship and so that they will be prevented from rotating. Another hollow tube 14 is adapted to slide inside of the tube 13, and inside of the tube 14 the square bar 15 may freely slide. The left-hand end of the tube 14 is sealed by a round sleeve 16 which is sweated onto the inner surface of the tube 14. The opening in the sleeve 16 is square-shaped to fit over the sides of the square bar 15 and so that the bar can freely slide through it. A spring member 20, on the opposite end of the square bar 15, engages the sleeve 16 when the tube 14 is fully extended and, therefore, limits the outward movement of the tube 14. The pin 17, holding the outer tube 13 to the member 10, prevents rotation of this tube, while the square-shaped portion of the sleeve 16, which is fastened securely to the tube 14 and slides over the square rod 15, prevents rotation of the tube 14. Fig. 4 clearly illustrates the respective positions of the tubes, bar, and sleeve.

The transmitter supporting bracket 19 has a circular extension 21 which fits into the end of the tube 14 and a pin or rivet 18 securely holds it onto the tube 14. The transmitter conducting wires 26 and 27 fastened to and supporting the transmitter 25, pass through insulated bushings 29 on each side of the supporting bracket 19 and through similar bushings 28 on the base plate 1, where they pass down through holes into the top of the switchboard 2. Inside of the switchboard 2, the usual well-known counter balance is provided so that, as the suspension arm is pulled in or out, the slack in the wires 26 and 27 will be automatically taken up, and the wires will at all times be taut.

If the suspension arm is to be rotated horizontally, the arm is moved and the member 5 rotates in the base plate 1, around the groove of the extension 9 in which the thumb screw 8 is in engagement. If a vertical movement of the suspension arm is desired, the arm is moved up or down, and the movement is limited by the pin 30 in the center of the member 5 engaging either end of the abutments 31. The bolt and nut 11 and 12 may be loosened up for this purpose, or the arm may be merely forced to the desired position, and the friction of the ear pieces 6 and 7 against the sides of member 10 hold the arm. As the inner tube 14 slides inside of the tube 13, it will be appreciated that the transmitter 25 may be moved in or out any desired amount, the spring stop 20 preventing the tube 14 from being drawn completely out of the tube 13 due to the sleeve 16 striking this member. Twisting of the transmitter 25, or twisting motion of the supporting bracket 19 is prevented by the square bar 15 which slides into square sleeve 16.

In former types of transmitter suspension arms employing tubular members which telescope into one another, the usual method of preventing the turning of the tubes was to provide a slot in one of the tubular members and a pin in the other. This greatly weakened one of the tubes, and applicant has, therefore, devised a simple transmitter suspension arm employing standard tubular members which are prevented from rotating relative to one another, and also a transmitter arm which has a movement in three different directions; laterally, vertically, and in-and-out; all three movements being combined in a single device which is of inexpensive construction and is easily operated.

What is claimed is:

1. In a transmitter suspension arm, a base plate for supplying the same attached to a telephone switchboard, tubular telescoping members supported by said base plate, a square rod inside said tube members, and means cooperating with said square rod for preventing turning movement of said tubular members.

2. In a transmitter suspension arm, a base plate therefor supporting said arm on an operator's switchboard, an outer tubular member having one end rigidly attached to said base, an inner tubular member inside said outer member and having one end arranged to support a transmitter, a square bar inside said inner member having one end attached to said base plate, and means on said inner member cooperating with said square bar for preventing turning movement of said tubular members.

3. In an operator's transmitter suspension arm, a base member attached to an operator's telephone switchboard, supporting member rotatable in said base, an outer tubular member having one end secured to said supporting member, an inner tube inside said outer tube having one end arranged to support a transmitter, a square bar inside said inner tube having one end attached to said supporting member and means on the opposite end of said square bar and on one end of said inner tube for preventing a rotating movement of said tubes.

4. In a transmitter suspension arm, a base plate for mounting said arm on an operator's switchboard, a supporting member mounted in said base plate and rotatable therein, a supporting bracket attached to said rotatable member and having a limited vertical movement, an outer circular tube having one end attached to said supporting bracket, an inner tube telescoping inside said outer tube and having one end arranged to support a telephone transmitter, a square rod inside said inner tube having one end secured to said supporting bracket, a sleeve attached to the opposite end of said inner tube and having a square-shaped opening for accommodating said square rod, a spring member attached to one end of said square bar to engage said sleeve member when said inner tube is almost completely withdrawn from said outer tube, and means for adjustably moving said inner tube in and out of said outer tube without rotary movement relative to each other.

5. In an operator's transmitter arm, a base member mounted on a switchboard, a rotatable member positioned in said base and adapted to rotate said arm horizontally, a supporting member positioned on said rotating member and adapted to move said arm vertically, a plurality of tubes telescoping within one another one of which is attached to said supporting member, means on another one of said tubes for preventing a turning motion of said tubes relative to one another, means for limiting the in and out movement of said tubes, and means for moving said transmitter arm in any one of said three directions or movements.

6. In a transmitter supporting arm having a supporting member adapted to move said transmitter arm horizontally and vertically, an outer tube having one end attached to said supporting member, an inner tube freely movable inside of said outer tube, a square rod having one end attached to said supporting member at a point adjacent one end of said outer tube, means on the opposite end of said square rod and on one end of said inner rod cooperating with each other for limiting the outward movement of said inner tube, and means on the opposite end of said inner tube for supporting the transmitter.

7. In an operator's transmitter arm, a base member adapted to move said transmitter arm in a plurality of different directions, an outer tube having one end securely attached to said supporting member, a square bar inside said outer tube having one end attached to said supporting member at a point where said outer tube is attached, an inner tube inside said outer tube and outside said square bar, one end of said inner tube supporting said transmitter, and means on the opposite end of said inner tube and one end of said square bar for limiting the in-and-out movement of said inner tube with respect to said outer tube.

8. In an operator's transmitter suspension unit comprising a supporting base member adapted to move said suspension unit in a plurality of different planes, an outer tube having one end attached to said supporting member the other end being free, an inner tube freely slidable within said outer tube having one end arranged to support an operator's telephone transmitter, an inner square-shaped bar having one end attached to said supporting member and the other end having a stop thereon, and a sleeve attached to one end of said inner member adapted to slide along said rod and engage said stop thereon to limit the in-and-out movement of said inner tube.

In witness whereof, I hereunto subscribe my name this 12th day of March, A. D. 1930.

HARRY H. IDE.